Oct. 25, 1927.
J. B. LA PIERRE
STEERING WHEEL
Filed Oct. 22, 1926
1,646,411
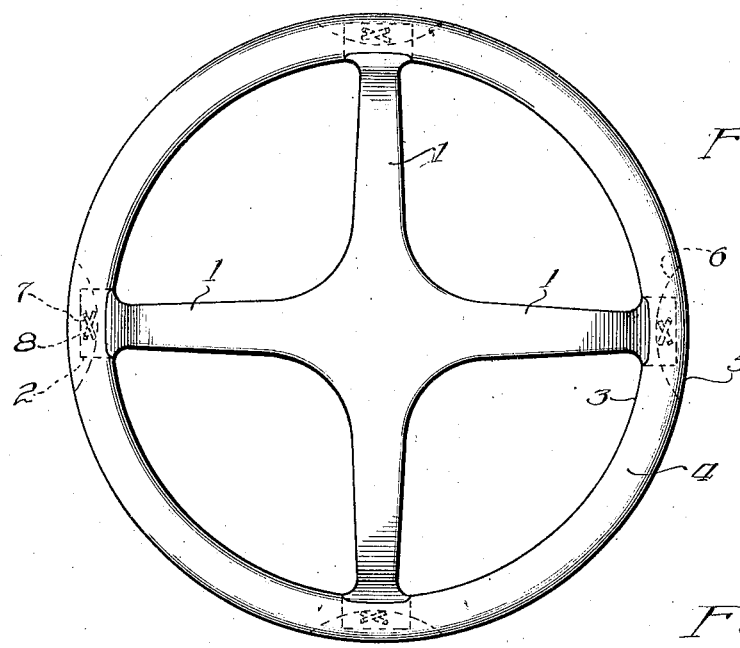
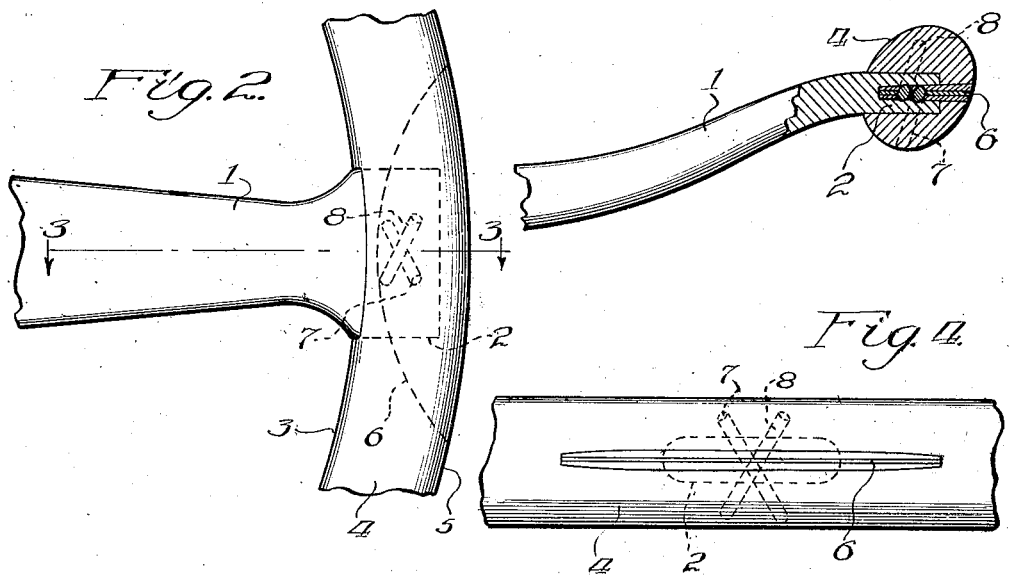
Inventor:
Julian B. La Pierre.
By Rummler & Rummler
Attys.

Patented Oct. 25, 1927.

1,646,411

UNITED STATES PATENT OFFICE.

JULIAN B. LA PIERRE, OF CHICAGO, ILLINOIS.

STEERING WHEEL.

Application filed October 22, 1926. Serial No. 143,399.

This invention relates to the construction of wooden steering wheels wherein it is desired that the wheel be of far greater strength than has heretofore been obtained in this type of steering wheel.

Greater strength in steering wheel construction is now necessitated due to the strength tests which are being placed on the wheels by some of the large automobile manufacturers. For example, one test now prescribed by the engineers of a prominent manufacturing company is that a weight of 600 pounds be placed on the hub of the wheel and then a 20 pound weight is dropped 18 inches striking on the rim of the wheel. In wheels subjected to this test, the tendency is for the spider arms to loosen and draw out of their mortises in the rim. Wood arm wheels, as a rule, are generally sufficiently strong around the center hub portions because they are ordinarily reinforced by the gripping action of two metal pieces placed on each side of the arms and tightened together by bolts. The weakest place in the ordinary existing constructions is at the point of insertion of the arms in the rim.

In the wood working art, unlike the metal working art, it is impossible to work with the fine precision that would result in closely fitted joints and square abutting shoulders, due to the fact that wood varies in its composition, some portions of the same piece being softer than others. Parts located in and near to knots are, for example, much harder than parts distantly located from the knot. Also cutters used in working wood become dull and when resharpened, the original perfect dimension of the cutter is lost, and therefore the resulting work is subject to considerable variation.

The style of steering wheel rim that is fast becoming popular is narrower across its face and thicker in depth so as to afford a better natural grip for the hands. This narrowing across the face of the rim makes it impossible to have as deep a mortise as heretofore had and therefore weakens the construction at the point where the rim is attached to the spider arms. Not having as deep a mortise as heretofore also cuts down the area of the surface to which glue is applied and therefore further tends to weaken the construction at this point.

This point of the construction is subjected to great strains as, for instance, when the front wheel of the car is too close to the curb and it is attempted to turn the wheel out short away from the curb. This unusual strain tends to loosen the end of the arm in its mortise, particularly where the wood happens to be soggy or soft.

When a car is driven over rough roads, striking ruts and stones there is a continued vibration upward, downward, sidewise. This continual vibration will soon loosen up the different points where the steering wheel parts are joined together, unless some means are employed for locking the parts together. It is unsatisfactory to have metal plates and studs and similar projecting parts on the surface of the rim as such parts have a tendency to irritate the hands of the driver.

The main object of this invention is to provide an improved steering wheel constructed entirely of wood; to provide improved means for locking the outer ends of the spider arms in their respective mortises in the rim; to provide a construction of this nature which will give a much larger surface area to which glue can be applied, than has heretofore been the case; and to provide improved locking means which will stay tight and secure for a long period of time and which will not be affected by the shrinkage or expansion of the different wooden parts but which utilizes such shrinkage or expansion for more positively locking the construction together.

An illustrative embodiment of this invention is shown in the accompanying drawings in which:

Figure 1 is a plan view of the improved type of steering wheel.

Fig. 2 is an enlarged detail of the outer end of a spider arm and a portion of the adjacent rim in which it is mortised.

Fig. 3 is a section taken on the line 3—3 of Fig. 2.

Fig. 4 is an end view looking to the left of the construction shown in Fig. 2.

In the construction shown in the drawings the steering wheel comprises a spider having a plurality of arms 1 with their outer ends 2 mortised in the inner periphery 3 of rim 4. Locking means which bear against the outer periphery 5 of the rim 4 are provided for holding the ends of the spider arms securely in their mortises and comprises a wedge 6 of Woodruff key shape which is tapered both in its long and short dimensions. The wedge 6 is adapted to be inserted through a slot cut in the outer periphery 5 of the rim, said slot being of sufficient depth to pass through and bifurcate the outer end 2 of arms 1 as shown in Figs. 2 and 3. The wedge 6 is preferably of laminated construction three layers being preferred so as to better withstand driving in the slot, and is of sufficient length to overlap the ends of the arm, thus forming a crosspiece 7 which is embedded in the rim. The wedge 6 is positively locked in its slot, by a pair of dowel pins 7 and 8, which are inserted in holes drilled in the under side of the rim 1 and pass through the outer ends 2 of the arms, through the wedge 6 and into the upper side of the rim. These dowel pins are so spaced and positioned that they cross each other as shown in Fig. 4.

In the construction of this steering wheel the outer ends of the arms are first glued in their mortises and allowed to dry, the ends of the arms being forced to the bottom of their mortises and forming as nearly as possible a good square abutting shoulder. After the glue has become thoroughly dried the semicircular slots or mortises are sawed into the outer periphery of the rim at points directly opposite the center points of arms, this slot extending into and bifurcating the outer end of the arms longitudinally. The surface of this slot and of the tapered wedge 6 is then covered with glue and the wedge driven into the slot. This glue is allowed to thoroughly dry and thereafter the holes are drilled for the dowel pins 6 and 7. The pins are covered with glue, driven in their respective holes and after time has been allowed for the glue to dry the wheel is in condition to have its exterior surface smoothed off and finished.

The wedge 6 is tapered in the manner shown for the purpose of not only making a tighter fit but also for holding the glue in the slot when the wedge is driven therein.

It will be noted that the dowel pins 7 and 8 pass through seven different layers of wood, three of which are in the laminated wedge 6, two of which are the bifurcated ends of the spider arm and the remaining two are the upper and lower sides of the rim. The purpose of this is so that expansion or contraction of the different layers of wood, some in one direction and some in another, tends to keep lateral strain on the dowel pins at all times and therefore provide a tight and secure construction for a long period of time and that does not become loosened through changes due to atmospheric conditions.

Although but one specific method of locking construction has been herein shown and described, it will be understood that the details of this construction may be altered or omitted without departing from the spirit of this invention as defined by the following claims.

I claim:

1. In a steering wheel construction, a rim, a spider arm mortised in the inner periphery of said rim, and a wedge engaging said arm and bearing against the outer periphery of said rim for holding said arm in its mortise.

2. In a steering wheel construction, a rim, a spider arm mortised in the inner periphery of said rim, said rim having a mortise cut in the outer periphery thereof extending into and bifurcating the end of said arm, and a wedge adapted to fit in said mortise for holding said arm to said rim.

3. In a steering wheel construction, a rim, a spider arm mortised in the inner periphery of said rim, said rim having a mortise cut in the outer periphery thereof extending into and bifurcating the end of said arm, a wedge adapted to fit in said mortise for holding said arm to said rim and means for locking said rim, wedge and arm together.

4. In a steering wheel construction, a rim, a spider arm mortised in the inner periphery of said rim, said rim having a mortise cut in the outer periphery thereof extending into and bifurcating the end of said arm, a wedge adapted to fit in said mortise for holding said arm to said rim and a dowel pin for locking said rim, wedge and arm together.

5. In a steering wheel construction, a rim, a spider arm mortised in the inner periphery of said rim, said rim having a mortise cut in the outer periphery thereof extending into and bifurcating the end of said arm, a wedge adapted to fit in said mortise for holding said arm to said rim and a pair of dowel pins arranged in crossed relation, passing through said rim, arm and wedge for the purpose set forth.

6. In a steering wheel construction, a rim, a spider arm mortised in the inner periphery of said rim and a wedge of laminated construction bearing against the outer periphery of said rim and engaging said arm for holding said arm in its mortise.

7. In a steering wheel construction, a rim, an arm mortised in one side of said rim, a wedge mortised in and bearing against the other side of said rim, and a dowel pin disposed transversely to the plane of said wedge, said dowel pin passing through said rim, arm and wedge for locking them together.

Signed at Chicago this 20th day of October, 1926.

JULIAN B. LA PIERRE.